US008301820B2

(12) United States Patent
Alexandre

(10) Patent No.: US 8,301,820 B2
(45) Date of Patent: Oct. 30, 2012

(54) DIRECT MEMORY ACCESS FOR ADVANCED HIGH SPEED BUS

(75) Inventor: Rudolph Alexandre, Saint-Josse-ten-Noode (BE)

(73) Assignee: STMicroelectronics Belgium N.V., Zaventem (BE)

( * ) Notice: Subject to any disclaimer, the term of this patent is extended or adjusted under 35 U.S.C. 154(b) by 726 days.

(21) Appl. No.: 12/484,027

(22) Filed: Jun. 12, 2009

(65) Prior Publication Data

US 2009/0265483 A1    Oct. 22, 2009

Related U.S. Application Data

(63) Continuation-in-part of application No. 11/394,176, filed on Mar. 30, 2006, now abandoned.

(30) Foreign Application Priority Data

Mar. 31, 2005 (EP) .................................. 05447073

(51) Int. Cl.
*G06F 13/00* (2006.01)

(52) U.S. Cl. .......... 710/308; 710/22; 710/309; 711/150; 711/151

(58) Field of Classification Search ........... 710/22, 710/113, 308, 309; 711/149–151
See application file for complete search history.

(56) References Cited

U.S. PATENT DOCUMENTS

| | | | | |
|---|---|---|---|---|
| 5,471,639 | A | * | 11/1995 | Harrington ..................... 710/22 |
| 6,249,833 | B1 | | 6/2001 | Takahashi |
| 6,701,432 | B1 | * | 3/2004 | Deng et al. ..................... 713/153 |
| 6,775,732 | B2 | | 8/2004 | Jahnke et al. |
| 6,789,174 | B2 | * | 9/2004 | Konishi et al. ................ 711/150 |
| 7,739,433 | B2 | * | 6/2010 | Yuenyongsgool et al. ... 710/100 |
| 2004/0076044 | A1 | | 4/2004 | Nowshoadi |
| 2004/0225769 | A1 | | 11/2004 | Pezzini |
| 2005/0021899 | A1 | | 1/2005 | Levy |
| 2005/0177674 | A1 | | 8/2005 | Ober et al. |

FOREIGN PATENT DOCUMENTS

| | | |
|---|---|---|
| JP | 08-278939 A | 10/1996 |
| JP | 2003308289 A | 10/2003 |

OTHER PUBLICATIONS

AMBA Specification (Rev 2.0) Announcement ARM, May 13, 1999, pp. 1-26, XP002288981.
Summons to Attend Oral Proceedings Pursuant to Rule 115(1) EPC, dated Feb. 6, 2008; cover pp. 1-6.
European Search Report from corresponding European Application No. 05447073.7, filed Mar. 31, 2005.

* cited by examiner

*Primary Examiner* — Glenn A Auve
(74) *Attorney, Agent, or Firm* — Wolf, Greenfield & Sacks, P.C.

(57) ABSTRACT

A memory system for use with a master-slave type bus such as an AHB bus has a memory, a bus interface to allow memory access from the bus, and a direct memory access interface to allow memory access from a DMA controller without occupying the bus. The system can reduce occupancy of the bus, it can allow dedicated DMA access protocols faster than the bus protocol to be used, and can remove or reduce the need for bus arbitration and associated circuitry and delays. An arbiter can arbitrate between the memory accesses and give priority to DMA accesses.

19 Claims, 4 Drawing Sheets

DIRECT MEMORY ACCESS FOR ADVANCED HIGH SPEED BUS

CROSS REFERENCE TO RELATED APPLICATIONS

This application is a Continuation-in-Part of U.S. application Ser. No. 11/394,176, filed Mar. 30, 2006 which claims priority to European Application No. EP05447073.7, filed Mar. 31, 2005, which are hereby incorporated by reference to the maximum extent allowable by law.

BACKGROUND OF THE INVENTION

1. Field of the Invention

This invention relates to memory systems for use with data busses, and to corresponding integrated circuits, methods and systems.

2. Discussion of the Related Art

Various master-slave type bus architectures are known. One is AMBA (Advanced Micro controller Bus Architecture), designed with three protocols:—ASB: Advanced System Bus—AHB: Advanced High-speed Bus—APB: Advanced Peripheral Bus. AHB was created to address certain shortcomings of ASB. AMBA has a Master which instigates transactions (16 max), a Slave which responds to transactions, and an arbiter which manages bus access according to a designer-defined arbitration scheme (round robin, TDMA, etc.) AHB is notable for having two multiplexed data busses, for using only the rising edge of the clock, and for enabling burst and split transfers. More detailed information can be obtained from the company ARM which developed it. In a multi-master AHB environment, the AHB bus is shared amongst multiple masters. A known example is an arrangement where a processor and a DMA (Direct Memory Access) controller are both coupled to memory via an AHB bus. Both can be masters of the bus. The master with the highest priority has an exclusive access to the bus. It means that during this time, the other masters can be stuck until the bus is freed. The overall efficiency can be reduced.

The present context is an architecture where two AHB masters (a processor and a DMA controller) share the same AHB bus to access a memory. There remains a need for improved arrangements.

SUMMARY OF THE INVENTION

An object of the invention is to provide improved memory systems for use with data busses, and to corresponding integrated circuits, methods and systems.

According to a first aspect, the invention provides:

A memory system for use with a master-slave type bus, the system having a memory, a bus interface to allow memory access from the bus, and a direct memory access interface to allow memory access from a DMA controller without occupying the bus.

This can enable a number of advantages compared to the known DMA arrangement. For example it can reduce occupancy of the bus, it can allow dedicated DMA access protocols faster than the bus protocol to be used, and can remove or reduce the need for bus arbitration and associated circuitry and delays.

An additional feature of some embodiments is an arbiter for arbitrating between the memory accesses. This can handle conflicts and in some cases replace arbitration by the bus, which tends to be more complex, costly, and lead to more delay.

Another such additional feature is the bus being an ASB or AHB type bus. This is intended to encompass AHB-lite and other similar types.

Another such additional feature is the arbiter being arranged to give priority to the DMA interface. This is useful to speed up DMA accesses further.

Another such additional feature is the arbiter being arranged to allow access to parts of the memory not used by the DMA interface while the DMA interface is accessing the memory. Similarly this can speed up DMA accesses further.

Another such additional feature is the arbiter being arranged to cause the bus interface to deassert an HREADY signal to give priority to the DMA interface.

Another such additional feature is the DMA interface and the bus interface being arranged to operate according to the same clock. This synchronization can help enable the arbiter to arrange prioritization in a very fast and efficient way allowing to reach the maximum throughput possible on the DMA bus. Indeed, as the address busses of the DMA and the AHB-Wrapper are synchronized, i.e. using the same clock, a combinatorial decoding of the address will directly solve the prioritization. In such a case there is no need for bus request/grant cycles.

Another aspect of the invention provides:

A system having a processor, a bus, a DMA controller and the memory system set out above.

Other aspects of the invention include corresponding methods of accessing memory, and corresponding integrated circuits.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which.

DETAILED DESCRIPTION

Figure 1:
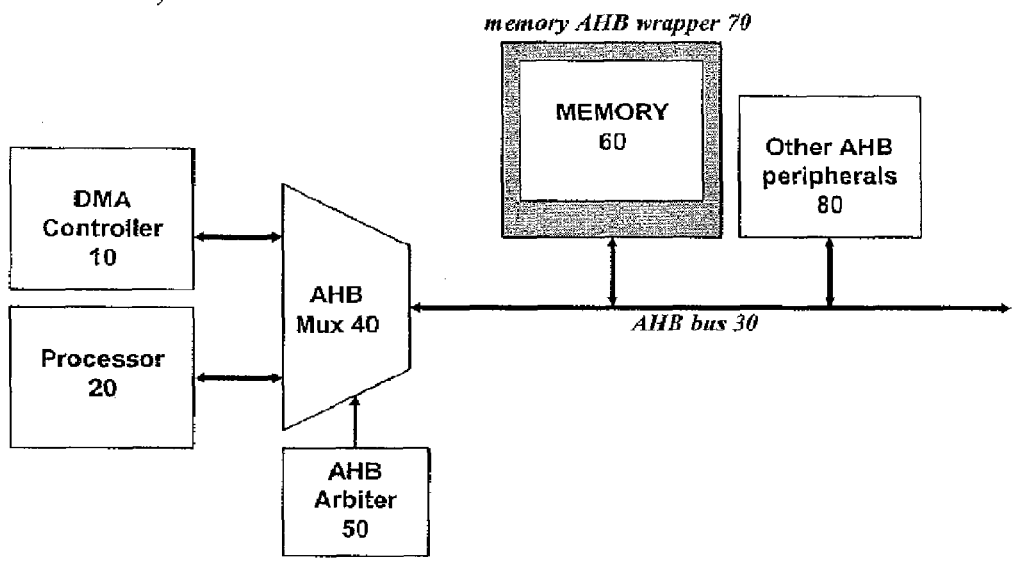
FIG. 1 shows a traditional AHB multi-master architecture

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. Where the term comprising is used in the present description and claims, it does not exclude other elements or steps. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The embodiment of the present invention described below effectively replaces the multi-master+AHB bus arbiter and bus multiplexer structure by a dedicated DMA bus to the memory together with a local arbiter giving priority to the DMA for memory access. If the processor tries to access a part of the memory while the DMA is also accessing the same part of the memory, the processor is halted until the DMA has finished its access. In another case where the processor does not want to access the memory, the AHB bus remains free even if the DMA is accessing the memory. The DMA accesses may provide access to the memory from other systems such as those using PCI (peripheral connect interface), PCMCIA (Personal Computer Memory Card International Association), USB (universal serial bus), SDIO (Secure Digital Input/Output), or other known interface standards for example.

By way of introduction, a conventional arrangement will be described. FIG. 1 shows a DMA controller 10, and a processor 20, both coupled to an AHB bus 30 via an AHB multiplexer 40. This is controlled by an AHB arbiter 50. A memory 60 is also coupled to the bus, via a memory AHB wrapper 70. Other AHB peripherals 80 can be coupled to the bus.

Figure 2A:
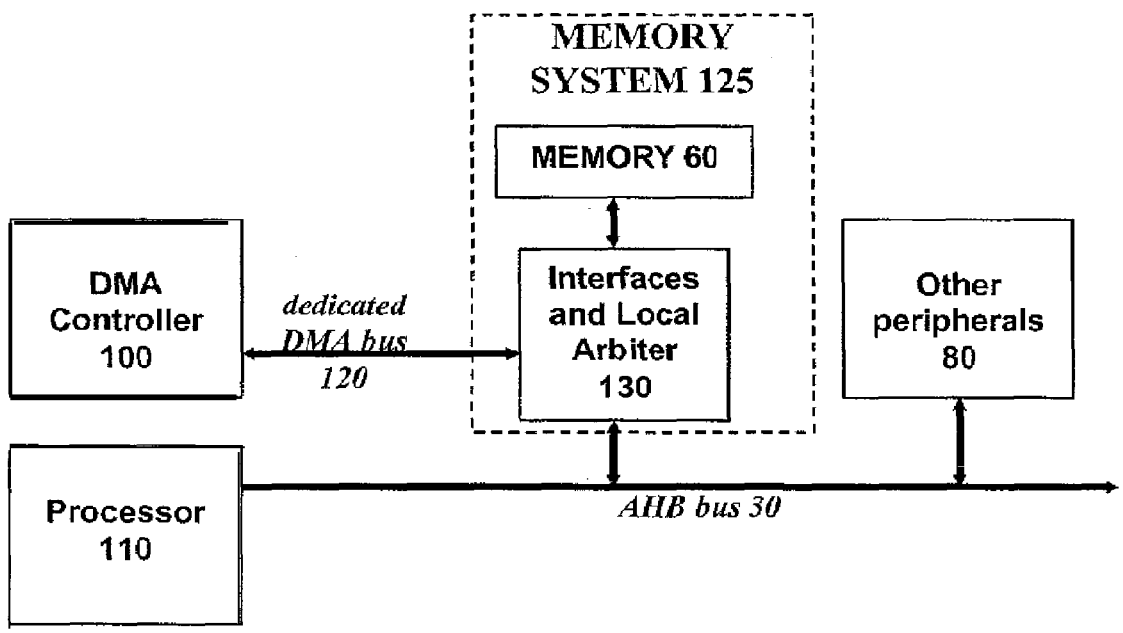
FIG. 2A shows an architecture according to a first embodiment.

FIG. 2A shows a first embodiment. In this arrangement, a DMA controller 100 is coupled to memory interfaces and local arbiter 130 via a dedicated DMA bus 120. A processor 110 is coupled to the bus, notably without needing the multiplexer and so on of FIG. 1. The memory is coupled to the interfaces and local arbiter 130. The memory system 125 encompasses the memory and the interfaces/arbiter 130.

Access priority is given to the DMA. The method provides a simple and very fast DMA protocol. This means that as soon as the dma_sel signal is asserted (i.e. "DMA accesses a part of the memory"), the address going to the is RAM, the RAM write-enable line, the RAM chip-select line and the Write data are generated by the DMA. Thus the dma_sel signal directly controls multiplexers between those signals and the one from AHB bus. Preferably, the dma_sel signal also directs the Read data from RAM to either the DMA or the AHB bus.

An important part of the local arbiter is its ability to quickly de-assert the HREADY signal to the AHB master.

AMBA implementations generally consider the HREADY signal at 2 places: the signal generated by each AHB slave (i.e. HREADYOut) and the signal effectively going to the AHB master (i.e. HREADYIn). HREADYIn is basically the HREADYOut of the active AHB device. The local arbiter generates the HREADYOut signal of the RAM AHB wrapper by combinatorially comparing the dma_sel signal (this is active if the DMA is accessing a part of the memory) and a delayed version of the HSEL AMBA signal (this is delayed because AMBA is a pipe-lined protocol). If there is a match, it means that both the AHB master and the DMA are trying to access the same part of the RAM memory and priority is given to the DMA by de-asserting the HREADYOut signal which prevents the AHB master (processor core) from accessing the same part of the memory until the DMA is finished. However, as long as the AHB Master is not trying to access the RAM (i.e. HSEL of the RAM not asserted), it is free to access other parts of the memory. For example, in some embodiments, the memory may be a dual-port RAM and the AHB Master and the DMA may simultaneously access different parts of the memory address map.

Figure 2B:
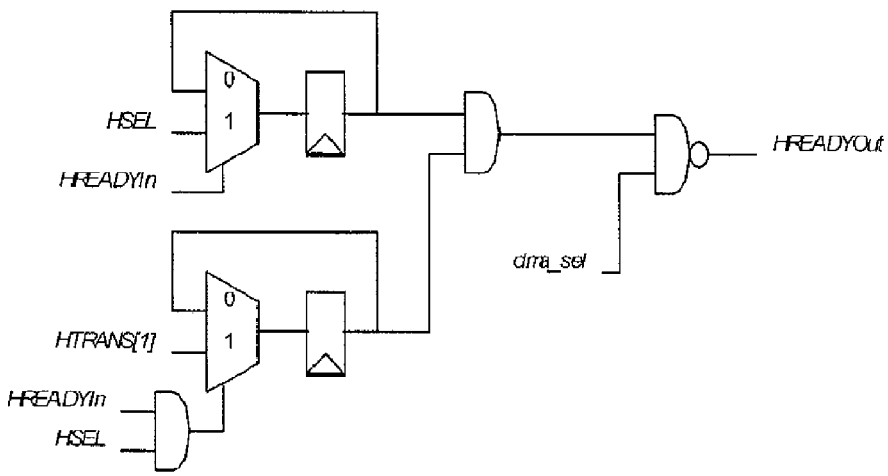
FIG. 2B shows a circuit for generating the HREADYOut signal in accordance with an embodiment of the present invention.

The generation of the HREADYOut signal is shown below in FIG. 2B, whereby HTRANS[1] is an AMBA signal indicating the transfer type—for further details see AMBA specifications.

Some advantages over the conventional DMA arrangement include at least one of:
  Simpler single-master AHB architecture (one master, no AHB mux, no AHB arbiter), and so the AHB-lite interface can be used.
  Higher throughput on the AHB bus.
  Faster DMA access to the memory since in place of the AHB protocol, a dedicated DMA protocol is possible.

Figure 3:
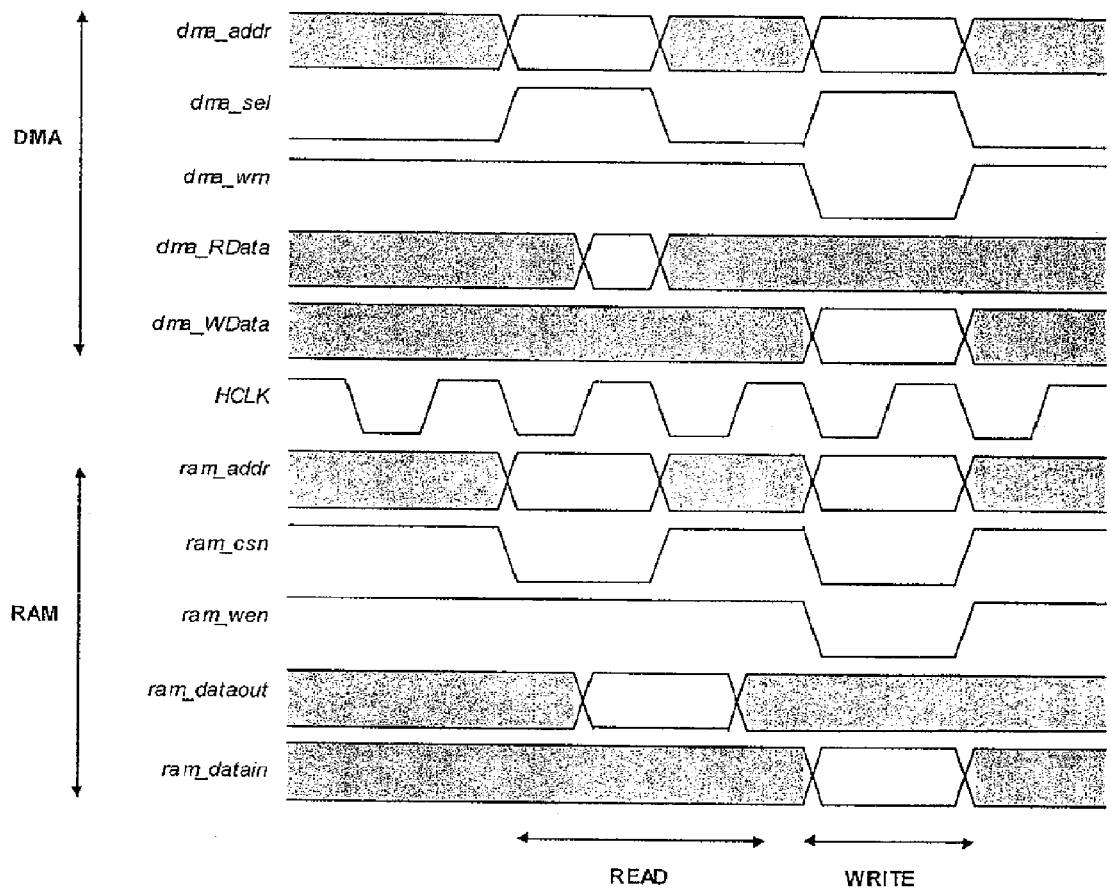
FIG. 3 shows a timing diagram for a very fast DMA protocol for the embodiment of FIG. 2.

The fast DMA protocol is illustrated in FIG. 3. It is quite simple: read and write operations are executed each within one clock cycle through the dedicated DMA bus. The figure shows a timing diagram for various signals for a read operation followed by a write operation to the memory. Some of the signals to the memory (e.g. RAM) are also shown when the DMA accesses it.

The DMA address signals and the DMA select signal are set by the DMA controller, and the interface/local arbiter accordingly sets the RAM address signals and the RAM CSN signal. The latter is the "chip-select" line of the memory (active low), meaning a decoding of the most significant bits of the address bus that, when asserted, instructs the system that the memory is being accessed. Within one clock cycle, the RAM data outputs are valid, and these are fed through the interfaces/arbiter to the DMA bus to appear as the DMA RDATA signals. The read operation ends with the addresses being removed, the RAM CSN signal being reasserted and the DMA select signal being dropped.

The DMA write operation can then start with the DMA addresses being set, the DMA select and DMA write signals being asserted, and write data being put onto the DMA Wdata signals by the DMA controller. The interfaces/arbiter then sets the RAM address and RAM data-in signals, and asserts the RAM CSN and RAM write enable (wen) signals. The memory writes the data into the given address, and the write cycle ends with the interfaces/arbiter unsetting the RAM address and RAM data-in signals, and deasserting the RAM CSN and RAM write enable (wen) signals.

Figure 4:
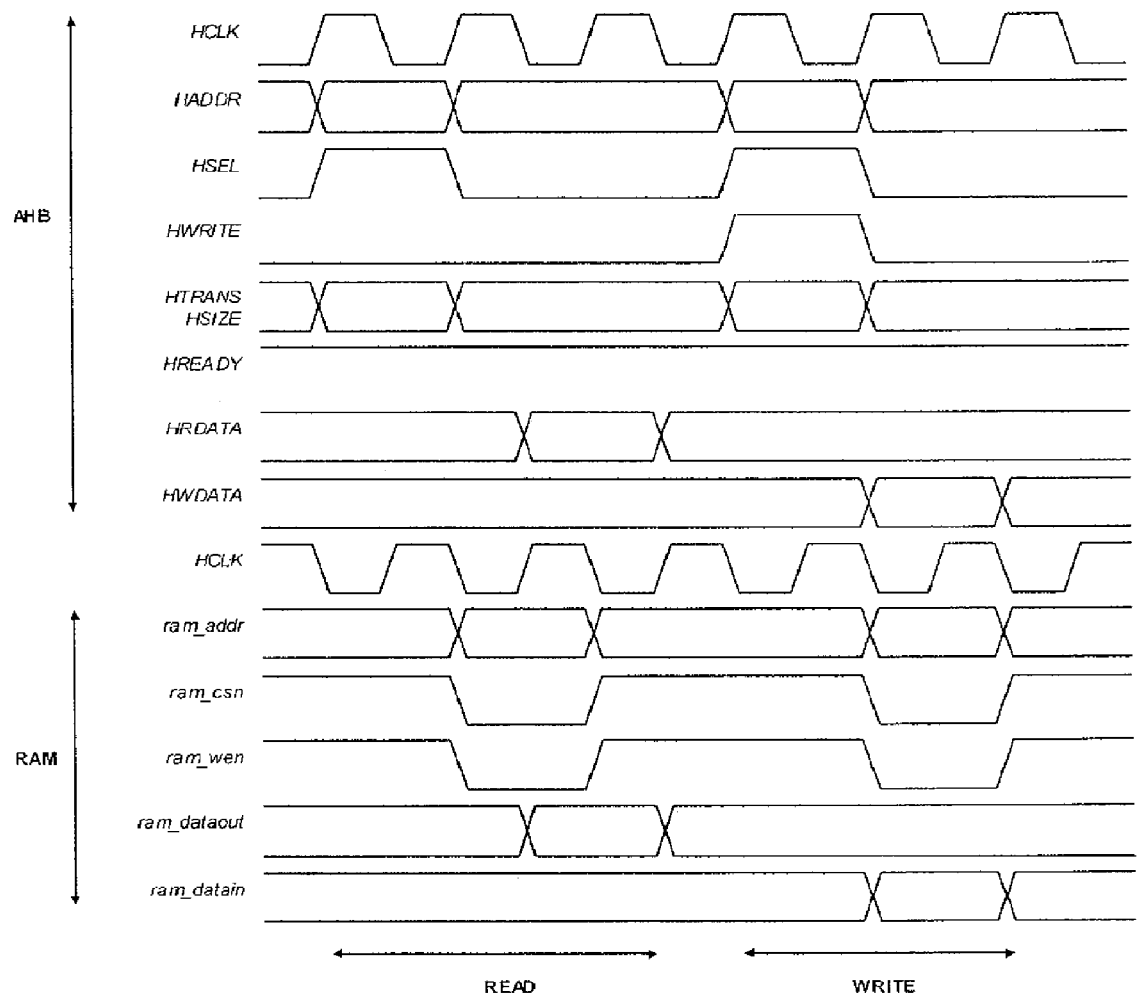
FIG. 4 shows a timing diagram for RAM AHB read and write accesses for the embodiment of FIG. 2.

FIG. 4 shows a known AHB read operation followed by a write operation to the RAM. The signals at the RAM interface are also shown for clarity.

The signals from the AHB bus are named with a letter H as a prefix, and include a CLK, address signals, a select, a write, transmission size signals, a ready signal, read data, and write data. As before, the read cycle involves the interface/arbiter receiving and passing the address signals and the select signal, and putting the read data back onto the bus, in this case after two clock cycles, rather than one. The write cycle is also longer than the corresponding DMA write cycle, as the write data is present on the bus only after the address, not at the same time.

Figure 5:
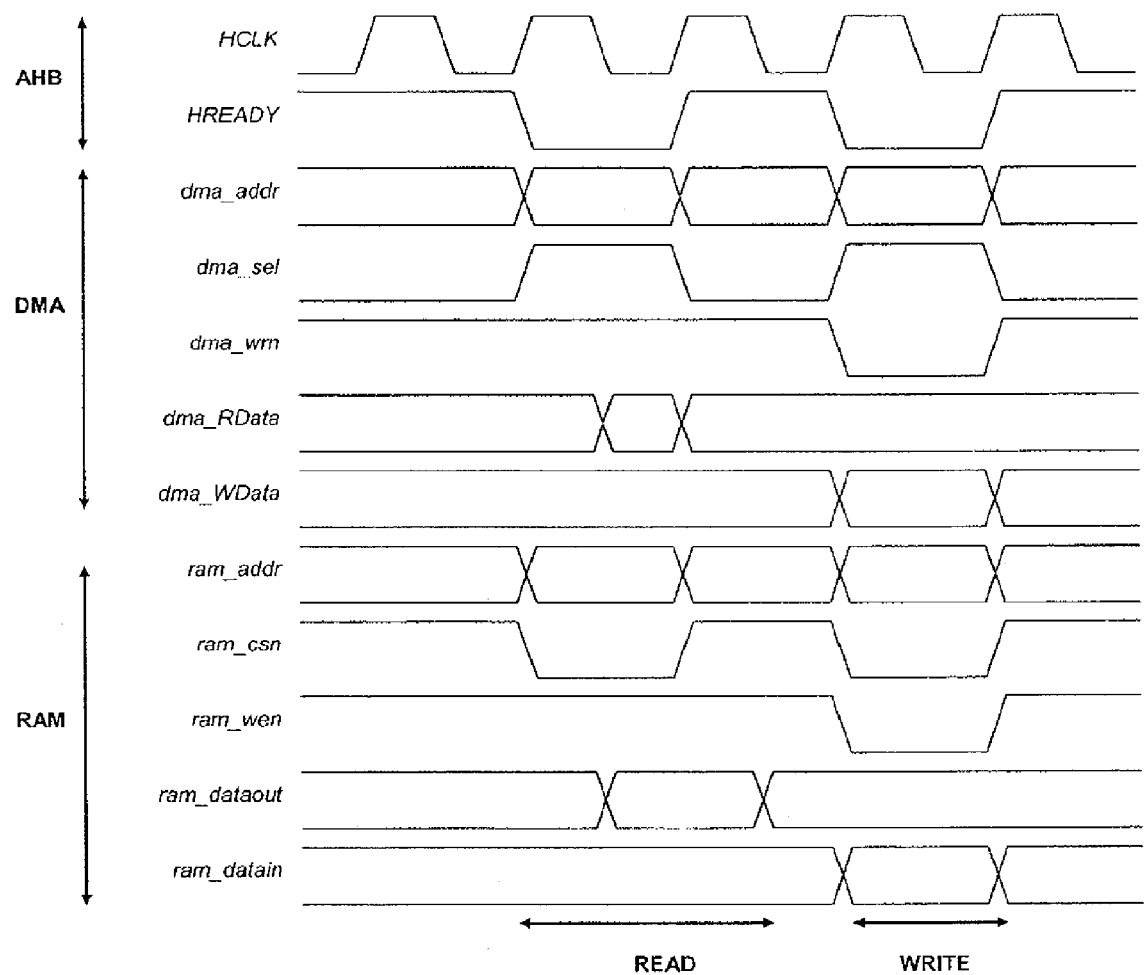
FIG. 5 shows a timing diagram for an DMA interface Read access to RAM.

FIG. 5 shows a timing diagram showing the role of the local arbiter inside the RAM Wrapper in giving priority to the DMA in case of conflict:

If the DMA is accessing the memory, the processor is left free to access other parts of the memory, meaning parts of the memory that differ from the memory address range used by the DMA. The arbiter enables simultaneous access to different parts of the memory. If the AHB Master does not access the RAM, the HREADYOut signal is not asserted and the AHB Master is left free to access other part of the full address map (see FIG. 2B).

If the DMA is accessing a part of the memory and the processor wants to access the same part of the memory during that time, the local arbiter puts the processor on hold by deasserting the HREADY signal.

If the processor is accessing a part of the memory and the DMA controller wants to access the same part of the memory during that time, the local arbiter deasserts the HREADY signal to give access to the part of the memory to the DMA controller; the processor continues its access after the DMA has finished.

If both the DMA controller and the processor wants to access the same part of the memory at the same time, priority is given to the DMA controller by the local arbiter, this is possible because the 2 busses work to the same clock. This allows the same clock to enable priority. Because the 2 busses work on the same clock, the bus lines are asserted simultaneously allowing a simple combinatorial decoding to see if both are accessing the same part of the memory and consequently setting the priority.

As has been described above, a memory system for use with a master-slave type bus such as an AHB bus (30) has a memory (60), a bus interface (130) to allow memory access from the bus, and a direct memory access interface (130) to allow memory access from a DMA controller without occupying the bus. Compared to the known DMA arrangement, it can reduce occupancy of the bus, it can allow dedicated DMA access protocols faster than the bus protocol to be used, and can remove or reduce the need for bus arbitration and associated circuitry and delays. An arbiter (130) can arbitrate between the memory accesses and give priority to DMA accesses. Other variations can be is conceived within the scope of the claims.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A memory system for use with a master-slave type bus, the system having a memory, a bus interface to allow memory access from the bus, a direct memory access (DMA) interface to allow memory access from a DMA controller without occupying the bus, and an arbiter for arbitrating between memory accesses, the arbiter allowing access to parts of the memory not used by the DMA interface while the DMA interface is accessing the memory, wherein the arbiter is configured to give priority to the DMA interface.

2. The memory system of claim 1, wherein the arbiter causes the bus interface to deassert an HREADY signal to give priority to the DMA interface.

3. The memory system of claim 1, the bus being an AHB type bus.

4. The memory system of claim 1, wherein the DMA interface and the bus interface operate according to the same clock.

5. A system having a processor, a bus, a DMA controller and the memory system of claim 1.

6. The system of claim 5, wherein the processor is the sole master for the bus.

7. An integrated circuit having the memory system of claim 1.

8. A method of accessing a memory, the method comprising:
   using a bus interface for accessing the memory from a master-slave type bus;
   using a direct memory access (DMA) interface to allow a DMA controller to access the memory without occupying the bus; and
   arbitrating between memory accesses so as to allow access to parts of the memory not used by the DMA interface while the DMA interface is accessing the memory, wherein the arbiter is configured to give priority to the DMA interface.

9. The method of claim 8, further comprising the arbiter causing the bus interface to deassert an HREADY signal to give priority to the DMA interface.

10. The method of claim 8, the DMA interface and the bus interface operating according to the same clock.

11. An apparatus for arbitrating between accesses to a device, the apparatus being connected to a bus interface to allow access to the device from the bus, and a DMA interface to allow access to the device from a DMA controller without accessing the bus, wherein the apparatus allows access to aspects of the device not used by the DMA interface while the DMA interface is accessing the device, wherein the apparatus is configured to give priority to the DMA interface.

12. The apparatus of claim 11, wherein the device is a memory.

13. The apparatus of claim 11, wherein the apparatus gives priority to the DMA interface.

14. The apparatus of claim 11, wherein the apparatus causes the bus interface to deassert an HREADY signal to give priority to the DMA interface.

15. The apparatus of claim 11, wherein the bus interface and the DMA interface operate according to the same clock.

16. A system comprising:
   a storage device;
   a bus interface arranged to allow access to the storage device from a bus;
   a direct memory access (DMA) interface arranged to allow access to the storage device from a DMA controller without occupying the bus;
   and an arbiter for arbitrating between accesses to the storage device, wherein the arbiter allows access to parts of the storage device not used by the DMA interface while the DMA interface is accessing the storage device, wherein the arbiter is configured to give priority to the DMA interface.

17. The system of claim 16, wherein the arbiter causes the bus interface to deassert an HREADY signal to give access priority to the DMA interface.

18. The system of claim 16, wherein the bus interface and the DMA interface operate according to the same clock.

19. The system of claim 16, wherein the storage device is a dual-port RAM.

* * * * *

UNITED STATES PATENT AND TRADEMARK OFFICE
CERTIFICATE OF CORRECTION

| | | |
|---|---|---|
| PATENT NO. | : 8,301,820 B2 | |
| APPLICATION NO. | : 12/484027 | |
| DATED | : October 30, 2012 | |
| INVENTOR(S) | : Rudolph Alexandre | |

It is certified that error appears in the above-identified patent and that said Letters Patent is hereby corrected as shown below:

Col. 3, line 42, should read:
the memory"), the address going to the RAM, the RAM Col. 5, line 34, should read:
accesses. Other variations can be conceived within the Signed and Sealed this
First Day of January, 2013

David J. Kappos
*Director of the United States Patent and Trademark Office*